(12) United States Patent
Kiefer

(10) Patent No.: US 6,640,370 B2
(45) Date of Patent: Nov. 4, 2003

(54) HAND TOOL FOR REMOVAL OF METAL CHIPS FROM BLIND HOLES

(76) Inventor: Gary Kiefer, 9304 Alden Rd., Harvard, IL (US) 60033

( * ) Notice: Subject to any disclaimer, the term of this patent is extended or adjusted under 35 U.S.C. 154(b) by 67 days.

(21) Appl. No.: 09/773,980

(22) Filed: Feb. 1, 2001

(65) Prior Publication Data

US 2002/0100133 A1 Aug. 1, 2002

(51) Int. Cl.[7] .................................................. B25F 1/00
(52) U.S. Cl. .................................... 7/170; 7/901; 7/167
(58) Field of Search ........................ 82/1–11, 46; 408/56, 408/59, 67; 7/170, 901, 169; 1/168

(56) References Cited

U.S. PATENT DOCUMENTS

| 1,014,449 A | 1/1912 | Berry |
| 1,982,737 A | 12/1934 | Judge |
| 2,325,627 A | 8/1943 | Neilson |
| 3,180,379 A | 4/1965 | Stewart |
| 3,246,351 A | 4/1966 | Lorence |
| 4,253,279 A | * 3/1981 | Althen ........................ 451/478 |
| 4,765,212 A | 8/1988 | Julius |
| 5,339,473 A | * 8/1994 | Crist ............................... 7/170 |
| 5,531,009 A | * 7/1996 | Givler ...................... 29/243.53 |
| 5,542,650 A | * 8/1996 | Abel et al. ................... 266/135 |
| 5,544,985 A | * 8/1996 | Lane ............................ 408/56 |

* cited by examiner

Primary Examiner—Henry W. H. Tsai

(57) ABSTRACT

A hand tool includes a handle sized and provided with an outer shape and finish to be comfortably grabbed and manually turned, and a shank extending from one end of the handle coaxially therewith. The shank is formed with a chip-engaging free end portion in the form of self-threading or self-tapping threads that continue to and terminate in a point at the free end thereof. A pile of chips at the bottom of a blind tapped hole is removed by inserting the free end of the threaded shank into the hole until the chips are encountered, turning the tool while applying a slight pressure such that the free end of the tool threads into the pile of chips, and then pulling the free end of the tool from the hole to remove the chips threaded thereon.

16 Claims, 3 Drawing Sheets

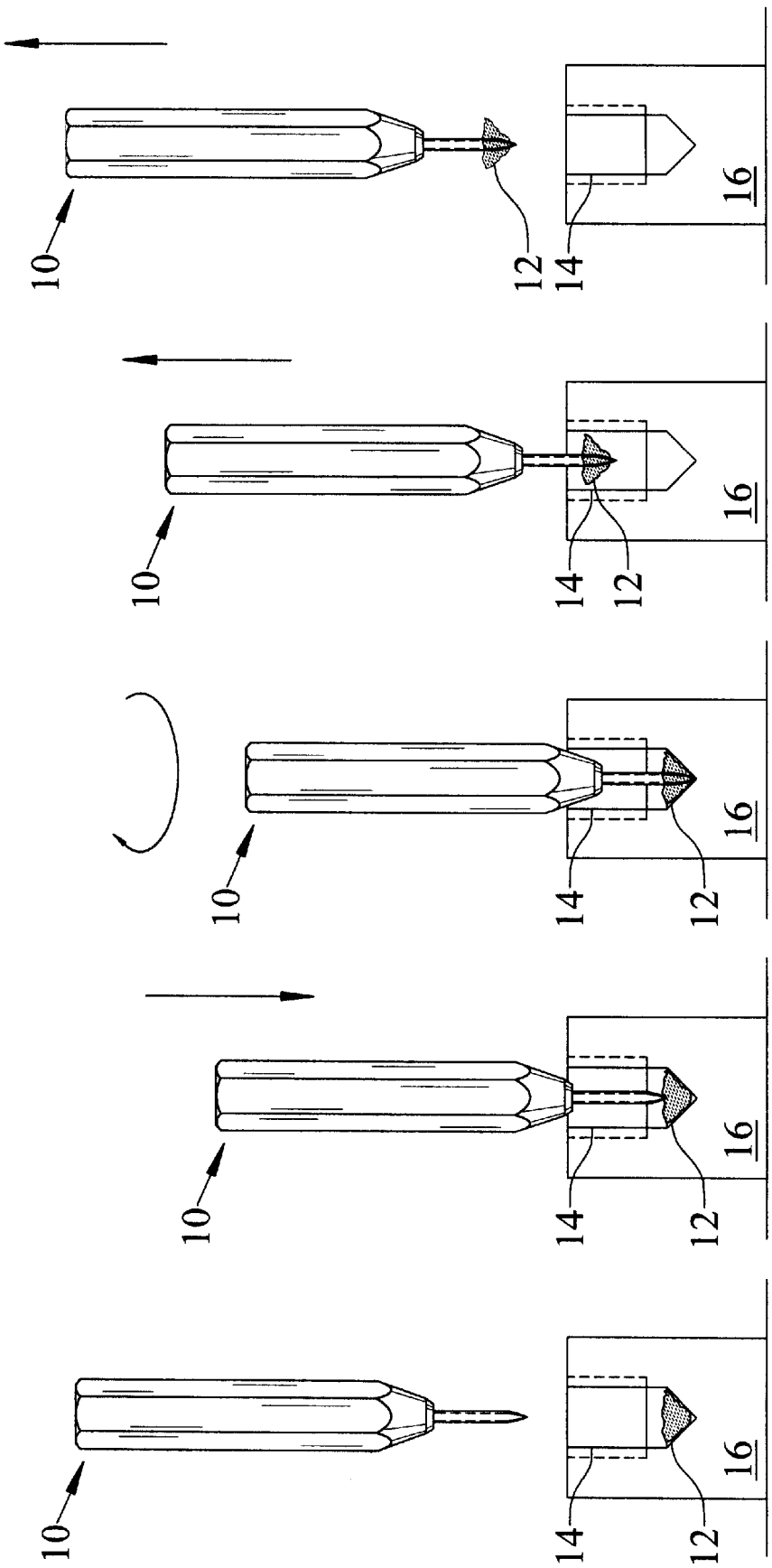

HAND TOOL FOR REMOVAL OF METAL CHIPS FROM BLIND HOLES

CROSS-REFERENCES TO RELATED APPLICATIONS

None.

BACKGROUND OF THE INVENTION

1. Field of Invention

The present invention relates generally to hand tools of the type useful in metal working or machine shop environments.

More particularly, the invention relates to a hand tool that is specially adapted for use in assisting in the removal of metal chips that are generated during the drilling or machining and tapping of a blind hole in a metal work piece.

2. Description of Prior Art

Machining and tapping blind holes in a metal work piece results in the collection of metal chips in the bottom of the hole.

Removal of these metal chips is a manual process, and can be at times rather difficult because a build-up of chips are typically pressed into the bottom of the hole by the threading tap.

Removal of such chips typically involves the use of a slender pick or similar probe that is provided with a pointed end which is typically turned at an angle such as approximately 90 degrees from the longitudinal axis of the pick.

In this instance, removal of the chips requires manually probing the blind hole with the end of the pick, and twisting and turning the pick, in an effort to snag the chips at the bottom of the hole so that they can be pulled out with the pick.

However, this techniques often results in the breaking up of the compressed pile of chips at the bottom of the hole, or the chips pull apart as they are being drawn from the hole, and therefore requires multiple attempts to remove all of the chips from the hole.

It is also common to attempt removal of metal chips from a blind hole by blowing the chips from the hole with compressed air utilizing a nozzle connected to a compressed air source such as shop compressor.

However, effective use of compressed air is limited to instances where the chips are relatively few and not compressed in the bottom of the hole, such as after use of a pick for removal of most of the chips.

Thus, it is apparent that removal of chips from blind holes is a labor intensive process, and in certain instances such as in parts with multiple blind holes, can add substantially to the cost of the part.

Therefore, there is a need for a new and improved tool and technique for removal of chips from blind holes (i) that facilitates a more complete chip removal process as compared with prior use of a pick, and (ii) such that the time required to remove the chips is reduced as compared with prior chip removal techniques, and thus the efficiency associated therewith is increased and the labor time and thus the cost is reduced.

SUMMARY OF THE INVENTION

The general aim of the present invention is to provide a new and improved hand tool and associated technique adapted to facilitate virtually complete chip removal from a blind hole with a single chip-removing process.

A detailed objective is to achieve the foregoing by providing a hand tool that is adapted to grab the compressed chips at the bottom of the hole with a single turning or twisting action such that the chips can then be removed as the tool is withdrawn from the hole.

These and other objectives and advantages of the invention will become more apparent from the following detailed description when taken in conjunction with the accompanying drawings.

In a preferred embodiment, a hand tool according to the invention includes an elongated handle sized and provided with an outer shape and finish to be comfortably grabbed and manually turned, and a shank extending from one end of the handle coaxially therewith. The shank is formed with a chip-engaging free end portion in the form of self-threading or self-tapping threads that continue to and terminate in a point at the free end thereof. A pile of chips at the bottom of a blind hole is removed by inserting the free end of the threaded shank into the hole until the chips are encountered, turning the tool while applying a slight pressure such that the free end of the tool threads into the chips, and then pulling the free end of the tool from the hole to remove the chips threaded thereon.

BRIEF DESCRIPTION OF THE DRAWINGS

FIGS. 5A–5E are views of a work piece having a blind hole machined and threaded therein, and showing sequentially the method of removal of chips from the bottom of the hole with the hand tool, the steps including (i) positioning of the chip removal hand tool aligned with the hole, (ii) inserting the hand tool into contact with the chips at the bottom of the hole, (iii) twisting the hand tool and threading the free end of the threaded shank into the chips, and (iv) withdrawing the hand tool with the chips threaded thereon from the hole.

Figure 3:
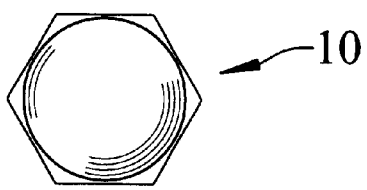
FIG. 3 is a top view of the hand tool taken along the line 3—3 of FIG. 1.

While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

Figure 1:
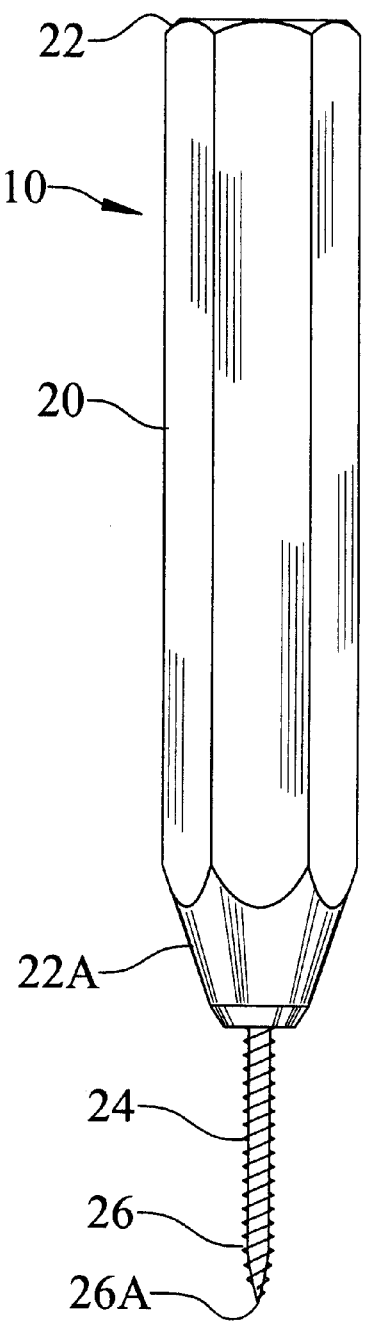
FIGS. 1 and 2 are front and side views, respectively, of a new and improved hand tool incorporating the unique aspects of the present invention.
Figure 2:
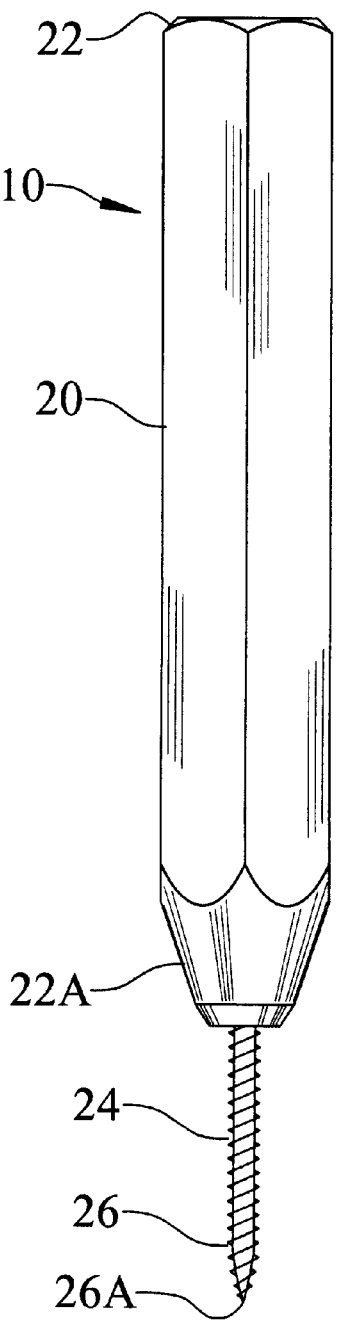

For purposes of illustration, one embodiment of a hand tool according to the present invention is shown in the drawings as embodied in tool 10 (see FIGS. 1–3).

In accordance with the present invention, the tool 10 is uniquely adapted to assist in the removal of metal chips 12 (FIG. 5A) from the bottom of blind holes 14 in a metal work piece 16 that result from the drilling or machining and tapping of the holes.

More particularly, the tool 10 is adapted to threadably engage the chips 12 at the bottom of the hole with an insertion and turning motion. The chips are then removed as the tool is withdrawn from the hole.

In carrying out the invention, the tool 10 includes an elongated handle 20 sized and provided with an outer shape and finish to be comfortably grabbed and manually turned.

In the embodiment shown, the handle 20 is formed with an outer profile of a hexagon shape, with the ends 22, 22A chamfered to eliminate sharp edges that would present a danger to the user. In this instance, it has been found that a hex of approximately ¾ inch across flats, and a length of approximately 4 to 4½ inches provides for a handle that is comfortable to grab, hold and manually turn in accordance herewith.

In alternate embodiments (not shown), the handle may be, for example, formed with generally round or cylindrical stock, with a knurl-type or other friction-gripping surface finish.

To provide for a lightweight, easy to use tool, the handle 20 is preferably made from anodized aluminum or molded from durable plastic.

The tool 10 also includes an elongated, relatively slender shank 24 extending from one end of the handle 20 coaxial with the longitudinal axis of the handle.

The free end portion 26 of the shank 24 is formed with a tapered threaded portion that terminates in a point such that the free end portion of the shank defines a self-threading or self-tapping thread configuration of the type having continuous threads and a smooth (i.e., non-broken) outer threaded profile.

In preferred embodiments, the threaded shank 24 is formed from hardened steel for enhanced durability and long life, and is formed with a double thread, with one of the threads preferably extending to the tip thereof.

With this arrangement, the pile of chips 12 at the bottom of the blind hole 14 are quickly and easily removed utilizing a simple technique illustrated sequentially in FIGS. 5A–5E.

The hand tool 10 is first aligned with the hole 14 (FIG. 5A) and the threaded shank is inserted into the hole until the free end of the shank engages the chips 12 at the bottom of the hole (FIG. 5B). The free end portion 26 of the shank is then threaded into the chips, preferably until the point of the tool reaches the bottom oft the hole, while applying a slight pressure toward the bottom of the hole (FIG. 5C). As a result, the chips 12 become threaded onto the free end portion of the threaded shank 26. The chips are then removed from the hole by simply withdrawing the end of the tool from the hole (FIGS. 5D–5E), after which the chips are removed from the tool and discarded.

Figure 4A:
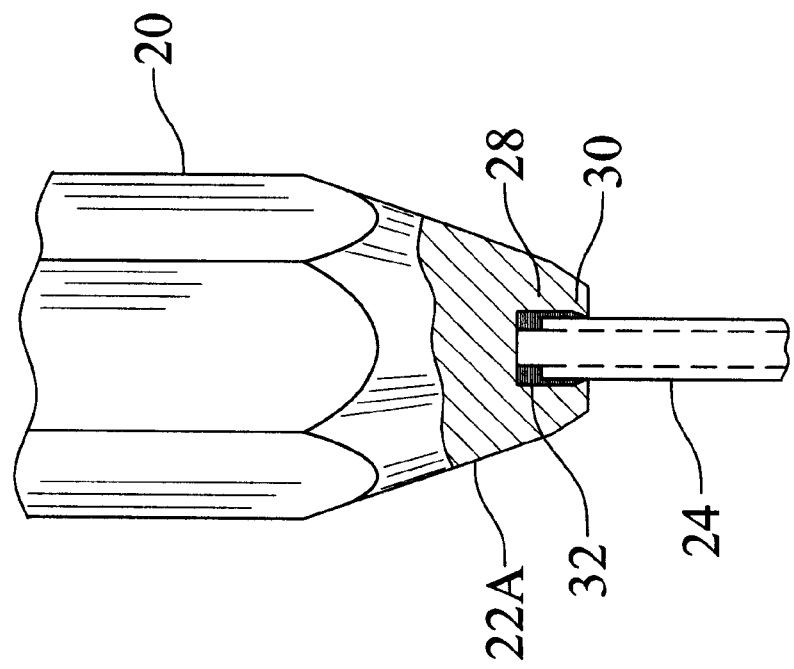
FIGS. 4A and 4B are enlarged, fragmentary cross-sectional view of a certain portion of the hand tool of FIG. 1, and showing prior to and after installation of the threaded shank portion, respectively, into the tool handle.
Figure 4B:
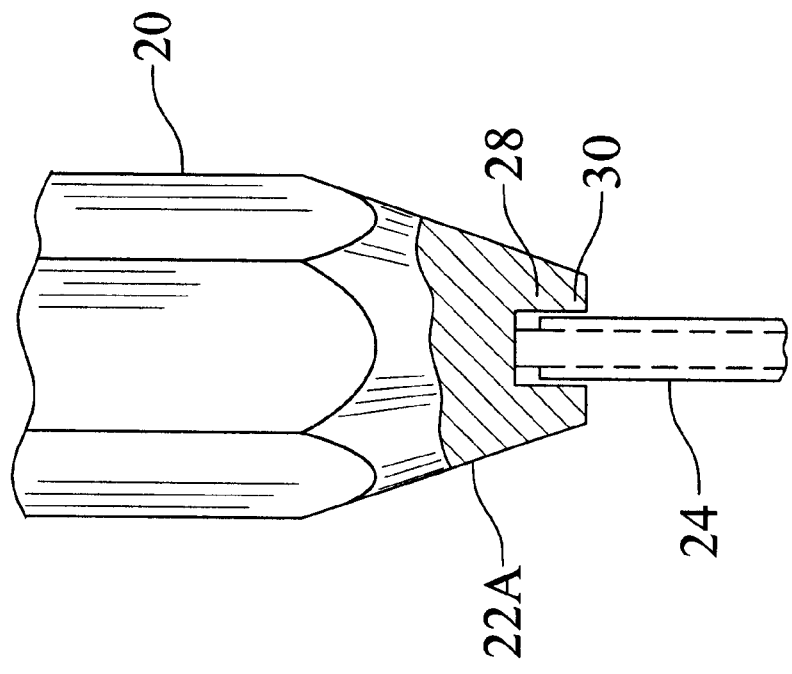

The self-tapping configuration of the threaded shank 24 may be provided with the use of a modified conventional screw or other threaded fastener. In this instance, the handle 20 is formed with a tapered end portion 22A and a blind hole 28 (FIG. 4A) sized to receive the head end portion of the screw shank after the head (not shown) has been removed. The head end portion of the screw shank is then inserted into and secured in the hole 28, to prevent the screw from loosening after repeated use, by filling the radial clearance between the hole and the screw shank with epoxy 32, and then crimping the tapered free end 22A of the handle onto the upper threads of the screw (FIG. 4B).

Advantageously, it has been found that conventional drywall screws are particularly suited for modification and use hereof because they are relatively inexpensive, they are formed from hardened steel, and they are formed with a double thread to reduce the number of turns needed to effect penetration into the pile of chips.

The size of the drywall screw (or other threaded shank) selected for use in the hand tool 10 will depend, in part, on the size of the tapped blind holes with which the tool is to be used. For example, it has been found that a #6 drywall screw is suitable for use in removing threads from standard #8 up to ⅜ inch threaded holes, and that a screw length of approximately 1½ to 2½ inches is a convenient length for the depth of most blind tapped holes of such thread sizes.

From the foregoing, it will be apparent that the present invention brings to the art a new and improved hand tool which, by virtue of the comfortable handle and self-tapping threaded operative end portion, is uniquely adapted to assist in relatively quick removal of chips from tapped blind holes, thus reducing the labor time and cost required to manufacture the part as compared with the use of prior tools and chip removal techniques.

I claim:

1. A method for removing metal chips from the bottom of a blind hole machined in a metal work piece, the method comprising the steps of:
   (A) providing a hand tool comprising:
      (1) a handle having first and second opposing ends and extending therebetween along a longitudinal central axis, the handle having an outer profile sized and shaped for comfortable manual grabbing and turning; and
      (2) a threaded shank extending coaxially from the second end of the handle, the shank having an end fixedly connected to the second end of the handle and a free end portion provided with a continuous outer thread tapering inwardly to a terminating free end point;
   (B) aligning the shank with the blind hole in the work piece;
   (C) inserting the free end portion of the shank into the blind hole;
   (D) manually turning the handle and threading the terminating free end and tapering thread of the shank into the metal chips; and
   (E) withdrawing the threaded shank and metal chips thereon from the hole.

2. The method as defined in claim 1 further comprising the steps of (F) providing said second end of said handle with a blind hole, and (G) securing said connected end of said shank into said blind hole in said handle.

3. The method as defined in claim 2 in which said securing step includes the step of crimping said connected end of said shank into said blind hole in said handle.

4. The method as defined in claim 2 in which said securing step includes the step of epoxying said connected end of said shank into said blind hole in said handle.

5. The method as defined in claim 2 in which said hand tool is formed according to a method comprising the steps of:
   (A) providing a drywall screw shank having a head end and a free end portion provided with a continuous outer thread tapering inwardly to a terminating free end point, and
   (B) securing the head end of the screw shank into the blind hole in the handle with the screw shank extending coaxial from the handle and the free end portion of the screw shank establishing said free end portion of the tool.

6. The method as defined in claim 1 in which the outer profile of said handle extends axially between said ends and generally symmetric about said axis.

7. The method as defined in claim 1 in which the outer profile of said handle is formed with a cross-sectional dimension perpendicular to said axis of approximately three-fourths (¾) of an inch.

8. The method as defined in claim 1 in which the length of the handle between said first and second opposing ends is between approximately four (4) to four and one-half (4½) inches.

9. The method as defined in claim 1 in which the free end portion of said shank is formed with a tapering double thread, with one of the double threads extending continuously to said terminating free end point.

10. A method for removing metal chips from the bottom of a blind hole machined in a metal work piece, the method comprising the steps of:

(A) providing a hand tool comprising:
   (1) a handle having first and second opposing ends and extending therebetween along a longitudinal central axis, the handle having an outer profile extending axially between said ends and generally symmetric about said axis, the outer profile being sized and shaped for comfortable manual grabbing and turning, the second end of the handle being formed with a recess extending generally toward the first end of the handle, and
   (2) a threaded shank extending coaxially from the second end of the handle, the shank having an end fixedly secured into said recess and having a free end portion provided with a continuous outer thread tapering to a terminating free end point;

(B) aligning the shank with the blind hole in the work piece;

(C) inserting the free end portion of the shank into the blind hole;

(D) manually turning the handle and threading the terminating free end point and tapering thread of the shank into the metal chips; and (E) withdrawing the threaded shank and metal chips thereon from the hole.

11. The method as defined in claim 10 in which said hand tool is formed according to a method comprising the step of crimping said secured end of said shank into said recess.

12. The method as defined in claim 10 in which said hand tool is formed according to a method comprising the step of epoxying said secured end of said threaded shank into said recess.

13. The method as defined in claim 10 in which said hand tool is formed according to a method comprising the steps of:

(A) providing a drywall screw shank having a head-end and a free end portion provided with a continuous outer thread tapering inwardly to a terminating free end point, and (B) securing the head-end portion of the screw shank into said recess with the screw shank extending coaxial from the handle and the free end portion of the screw shank establishing said free end portion of the tool.

14. The method as defined in claim 10 in which the outer profile of said handle is formed with a cross-sectional dimension perpendicular to said axis of approximately three-fourths (¾) of an inch.

15. The method as defined in claim 10 in which the length of the handle between said first and second opposing ends is between approximately four (4) to four and one-half (4½) inches.

16. The method as defined in claim 10 in which the free end portion of said shank is formed with a tapering double thread, with one of the double threads extending continuously to said terminating free end point.

\* \* \* \* \*